United States Patent
Yamamoto et al.

(10) Patent No.: US 11,049,392 B2
(45) Date of Patent: Jun. 29, 2021

(54) POSITION CAPTURE METHOD AND SYSTEM

(71) Applicants: Aichi Steel Corporation, Tokai (JP); Advanced Smart Mobility Co., Ltd., Tokyo (JP)

(72) Inventors: Michiharu Yamamoto, Tokai (JP); Tomohiko Nagao, Tokai (JP); Hitoshi Aoyama, Tokai (JP); Keiji Aoki, Tokyo (JP)

(73) Assignees: AICHI STEEL CORPORATION, Tokai (JP); ADVANCED SMART MOBILITY CO., LTD., Tokyo (JP)

( * ) Notice: Subject to any disclaimer, the term of this patent is extended or adjusted under 35 U.S.C. 154(b) by 210 days.

(21) Appl. No.: 16/305,883

(22) PCT Filed: May 30, 2017

(86) PCT No.: PCT/JP2017/020048
§ 371 (c)(1),
(2) Date: Nov. 29, 2018

(87) PCT Pub. No.: WO2017/209112
PCT Pub. Date: Dec. 7, 2017

(65) Prior Publication Data
US 2020/0320870 A1    Oct. 8, 2020

(30) Foreign Application Priority Data

Jun. 3, 2016    (JP) .............................. JP2016-111996

(51) Int. Cl.
*G08G 1/01*    (2006.01)
*G08G 1/042*    (2006.01)
(Continued)

(52) U.S. Cl.
CPC .............. *G08G 1/042* (2013.01); *G01C 21/28* (2013.01); *G01S 19/14* (2013.01); *G01S 19/48* (2013.01)

(58) Field of Classification Search
CPC ........ G08G 1/042; G01C 21/28; G01S 19/14; G01S 19/48
(Continued)

(56) References Cited

U.S. PATENT DOCUMENTS

| 4,908,557 A | 3/1990 | Sudare et al. |
| 5,189,612 A * | 2/1993 | Lemercier ............ G05D 1/0261 701/23 |

(Continued)

FOREIGN PATENT DOCUMENTS

| JP | H06-34743 A | 2/1994 |
| JP | H0634743 A * | 2/1994 |

(Continued)

OTHER PUBLICATIONS

Extended European Search Report dated May 6, 2019 in European Application No. 17806665.0-1003.
(Continued)

*Primary Examiner* — Kerri L McNally
*Assistant Examiner* — Thang D Tran
(74) *Attorney, Agent, or Firm* — Xsensus LLP

(57) ABSTRACT

A position capture method for capturing an own vehicle position by using a positioning part that measures a position of a vehicle (4) and a plurality of magnetic markers (5) laid on a traveling path of the vehicle (4) with their laying positions specified includes: upon detection of any of the plurality of magnetic markers (5), selecting, from among the laying positions of the plurality of magnetic markers (5), the laying position located nearest to an actual measured position measured by the positioning part; and capturing, as the
(Continued)

own vehicle position, a corrected position based on the laying position, thereby making high-accuracy position capture possible.

15 Claims, 11 Drawing Sheets

(51) Int. Cl.
    *G01C 21/28*       (2006.01)
    *G01S 19/14*       (2010.01)
    *G01S 19/48*       (2010.01)

(58) Field of Classification Search
    USPC .......................................................... 340/941
    See application file for complete search history.

(56) References Cited

U.S. PATENT DOCUMENTS

| | | | |
|---|---|---|---|
| 5,191,528 A | 3/1993 | Yardley et al. | |
| 5,347,456 A * | 9/1994 | Zhang | G05D 1/0261 180/168 |
| 5,357,437 A * | 10/1994 | Polvani | G01C 21/165 701/518 |
| 5,926,126 A * | 7/1999 | Engelman | B60W 30/16 342/70 |
| 6,012,013 A * | 1/2000 | McBurney | G01S 19/13 340/988 |
| 6,268,825 B1 * | 7/2001 | Okada | B60T 8/172 342/357.52 |
| 6,336,064 B1 * | 1/2002 | Honkura | G01C 21/26 701/23 |
| 6,337,637 B1 * | 1/2002 | Kubota | B60T 7/18 180/271 |
| 6,377,211 B1 * | 4/2002 | Hsiung | H01Q 1/3275 342/359 |
| 6,502,031 B2 * | 12/2002 | Uehara | G01C 21/28 180/167 |
| 6,772,062 B2 * | 8/2004 | Lasky | G05D 1/0261 180/168 |
| 7,268,700 B1 * | 9/2007 | Hoffberg | G08G 1/20 340/905 |
| 7,298,289 B1 * | 11/2007 | Hoffberg | G01C 21/26 340/903 |
| 9,207,679 B1 * | 12/2015 | Chatham | B60W 30/12 |
| 2002/0022926 A1 * | 2/2002 | Suzuki | G01C 21/26 701/525 |
| 2002/0065600 A1 * | 5/2002 | Oka | G08G 1/042 701/516 |
| 2002/0143442 A1 * | 10/2002 | Uehara | G01C 21/28 701/23 |
| 2002/0143465 A1 * | 10/2002 | Uehara | G01C 21/28 701/518 |
| 2003/0046021 A1 * | 3/2003 | Lasky | G05D 1/0261 702/150 |
| 2004/0158366 A1 * | 8/2004 | Dieterle | B60K 31/0058 701/23 |
| 2004/0158390 A1 * | 8/2004 | Mukaiyama | G01C 21/26 701/400 |
| 2004/0195357 A1 * | 10/2004 | Doherty | E01C 19/21 239/172 |
| 2005/0187694 A1 * | 8/2005 | Shiiba | B60W 10/184 701/70 |
| 2005/0218718 A1 * | 10/2005 | Iwatsuki | B60T 8/1766 303/177 |
| 2007/0050133 A1 * | 3/2007 | Yoshikawa | G01C 21/3658 701/437 |
| 2008/0125972 A1 * | 5/2008 | Neff | B60W 40/02 701/300 |
| 2009/0128139 A1 | 5/2009 | Drenth et al. | |
| 2009/0287376 A1 * | 11/2009 | Aso | B60W 10/20 701/42 |
| 2011/0118967 A1 * | 5/2011 | Tsuda | B60W 30/10 701/117 |
| 2011/0184605 A1 * | 7/2011 | Neff | G05D 1/0255 701/25 |
| 2013/0304326 A1 * | 11/2013 | Van Dongen | G06F 7/00 701/42 |
| 2015/0045986 A1 * | 2/2015 | Kan | B60W 40/08 701/1 |
| 2015/0294430 A1 * | 10/2015 | Huang | B60W 10/18 705/7.24 |
| 2015/0294566 A1 * | 10/2015 | Huang | G08G 1/133 701/41 |
| 2016/0132705 A1 * | 5/2016 | Kovarik | G06K 7/10376 340/10.3 |
| 2016/0297447 A1 * | 10/2016 | Suzuki | B60W 30/18163 |

FOREIGN PATENT DOCUMENTS

| | | |
|---|---|---|
| JP | H10-47983 A | 2/1998 |
| JP | H10-83499 A | 3/1998 |
| JP | H11-125529 A | 5/1999 |
| JP | 2000-322691 A | 11/2000 |
| JP | 2001-101588 A | 4/2001 |
| JP | 2002-334400 A | 11/2002 |
| JP | 2004-342083 A | 12/2004 |

OTHER PUBLICATIONS

Tan, H-S., "Develop Precision Docking Function for Bus Operation," California PATH Research Report, UCB-ITS-PRR-2003-11, ISSN 1055-1425, California PATH Program, Institute of Transportation Studies, University of California, Berkeley, pp. 15-18 (Mar. 2003).

English-language translation of International Search Report and Written Opinion for International Application No. PCT/JP2017/020048, dated Sep. 5, 2017.

\* cited by examiner

[FIG. 1]
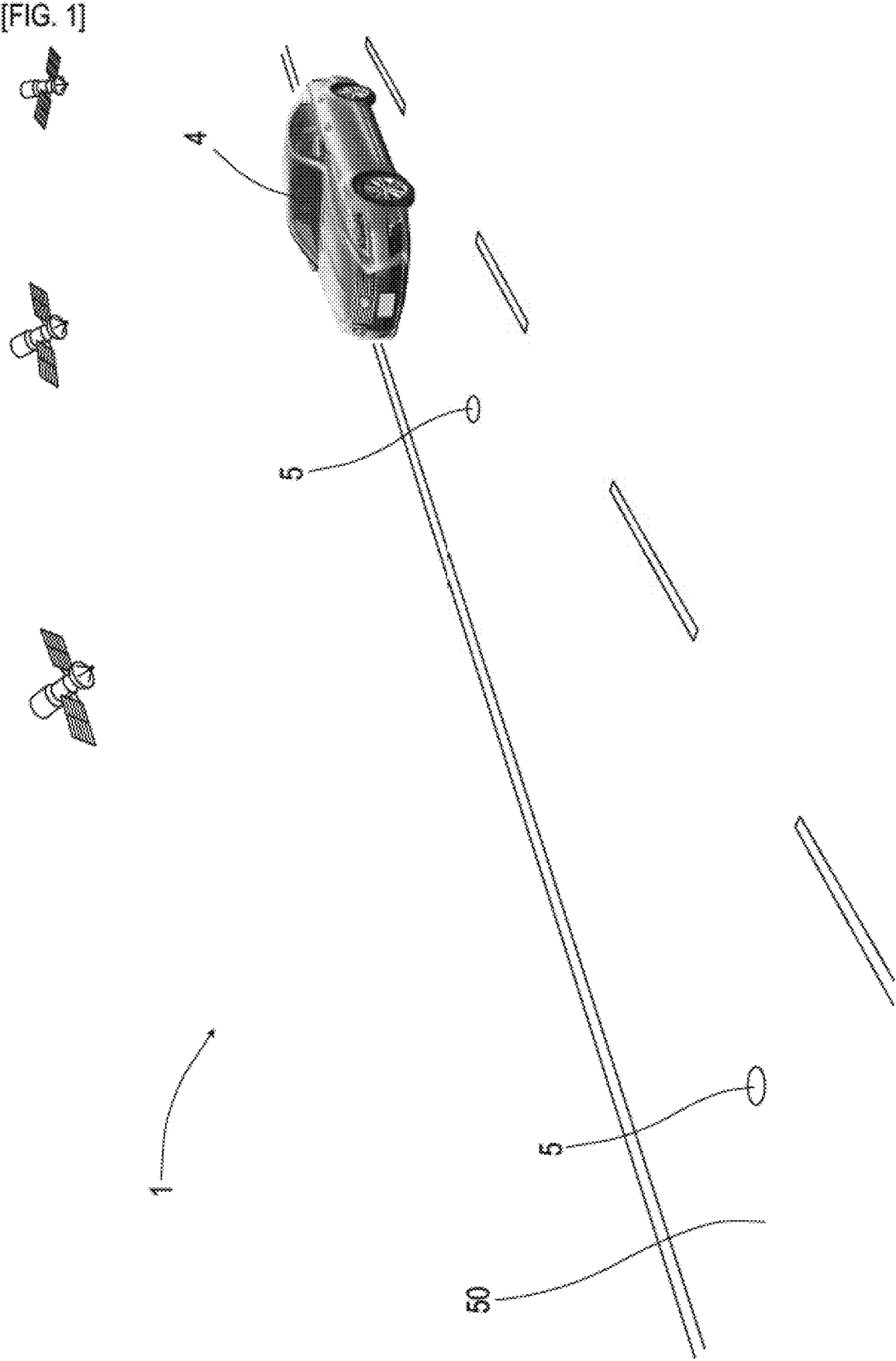

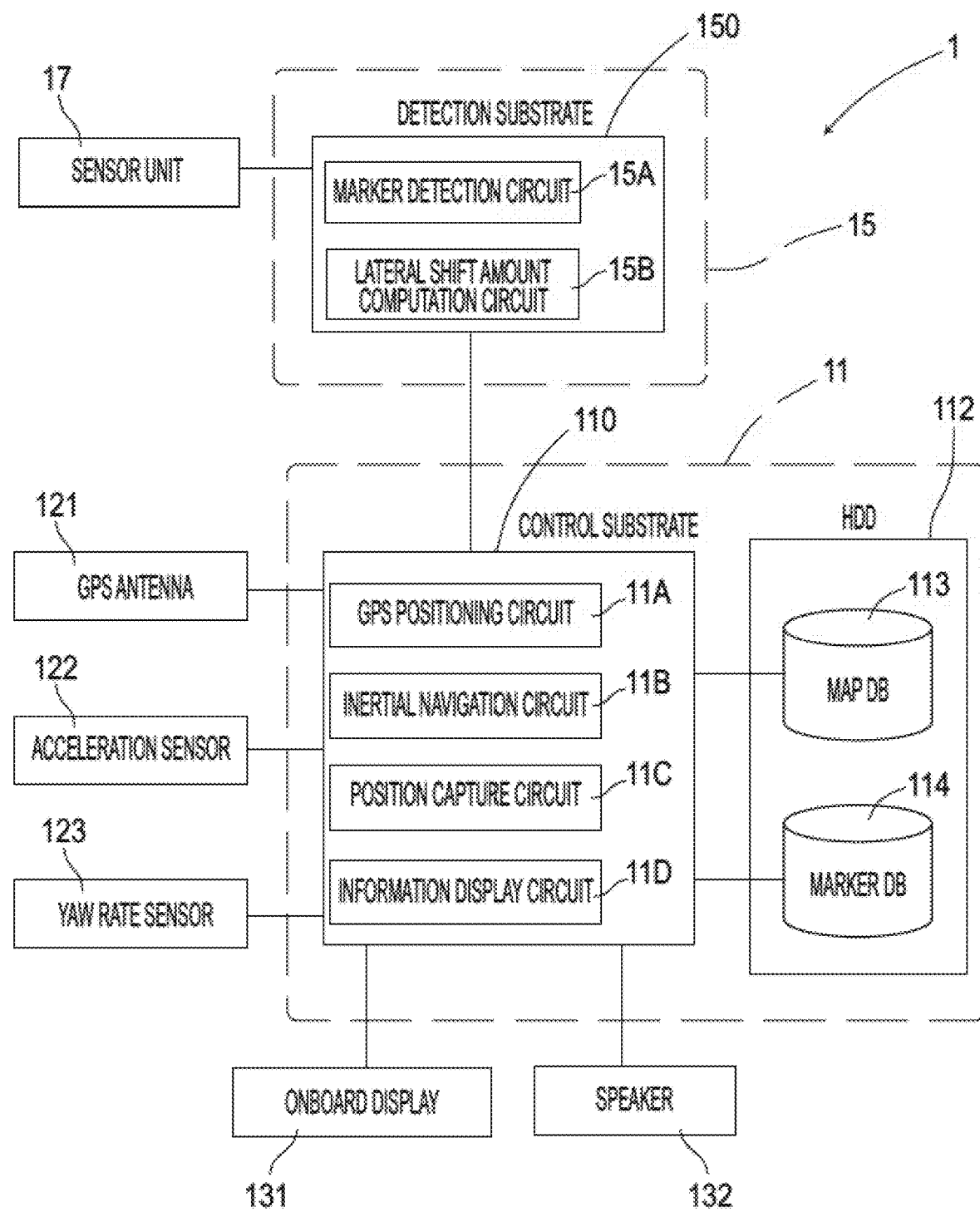
[FIG. 2]

[FIG. 3]
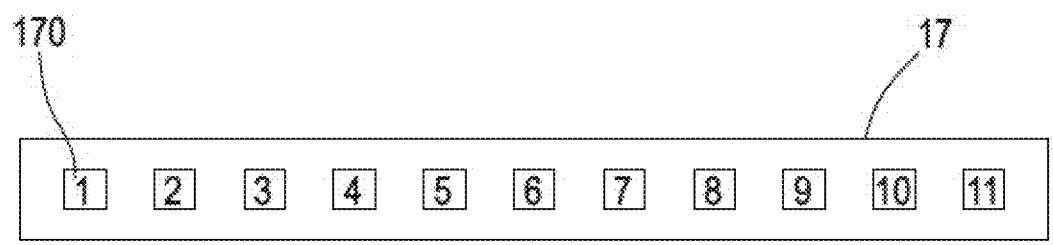

[FIG. 4]
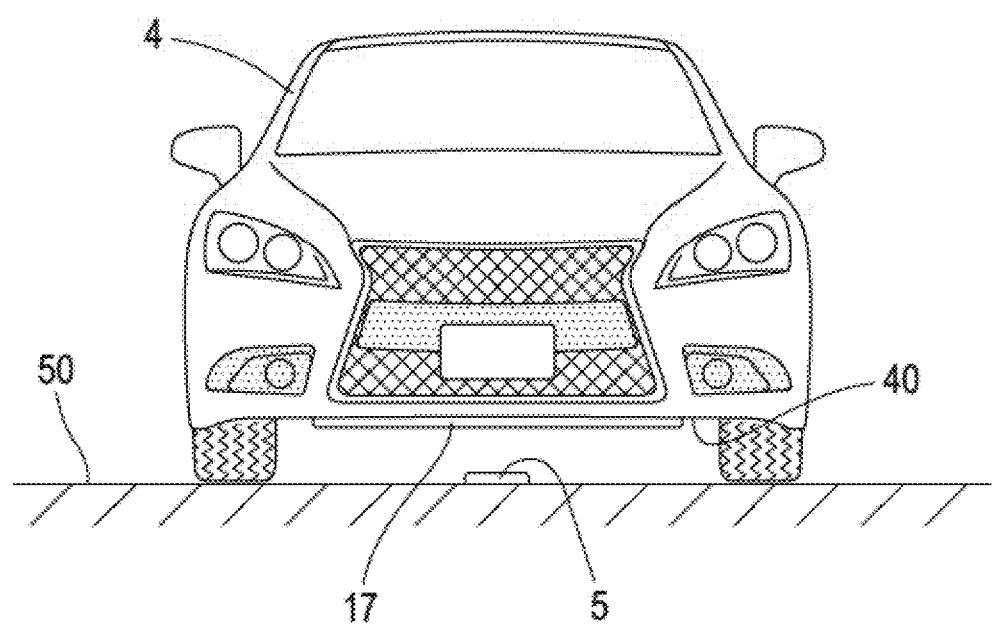

[FIG. 5]

MARKER COORDINATE TABLE

| | LAYING POSITION COORDINATES | | AZIMUTH IDENTIFICATION SECTION | SECTION INFORMATION | |
|---|---|---|---|---|---|
| | X COORDINATE | Y COORDINATE | | SPAN SL | REFERENCE AZIMUTH |
| MARKER 1 | X1 | Y1 | × | — | — |
| MARKER 2 | X2 | Y2 | × | — | — |
| ⋮ | ⋮ | ⋮ | ⋮ | ⋮ | ⋮ |
| MARKER m | Xm | Ym | ○ | 2000 mm | 235° |
| ⋮ | ⋮ | ⋮ | ⋮ | ⋮ | ⋮ |
| MARKER n | Xn | Yn | × | — | — |
| ⋮ | ⋮ | ⋮ | ⋮ | ⋮ | ⋮ |

[FIG. 6]
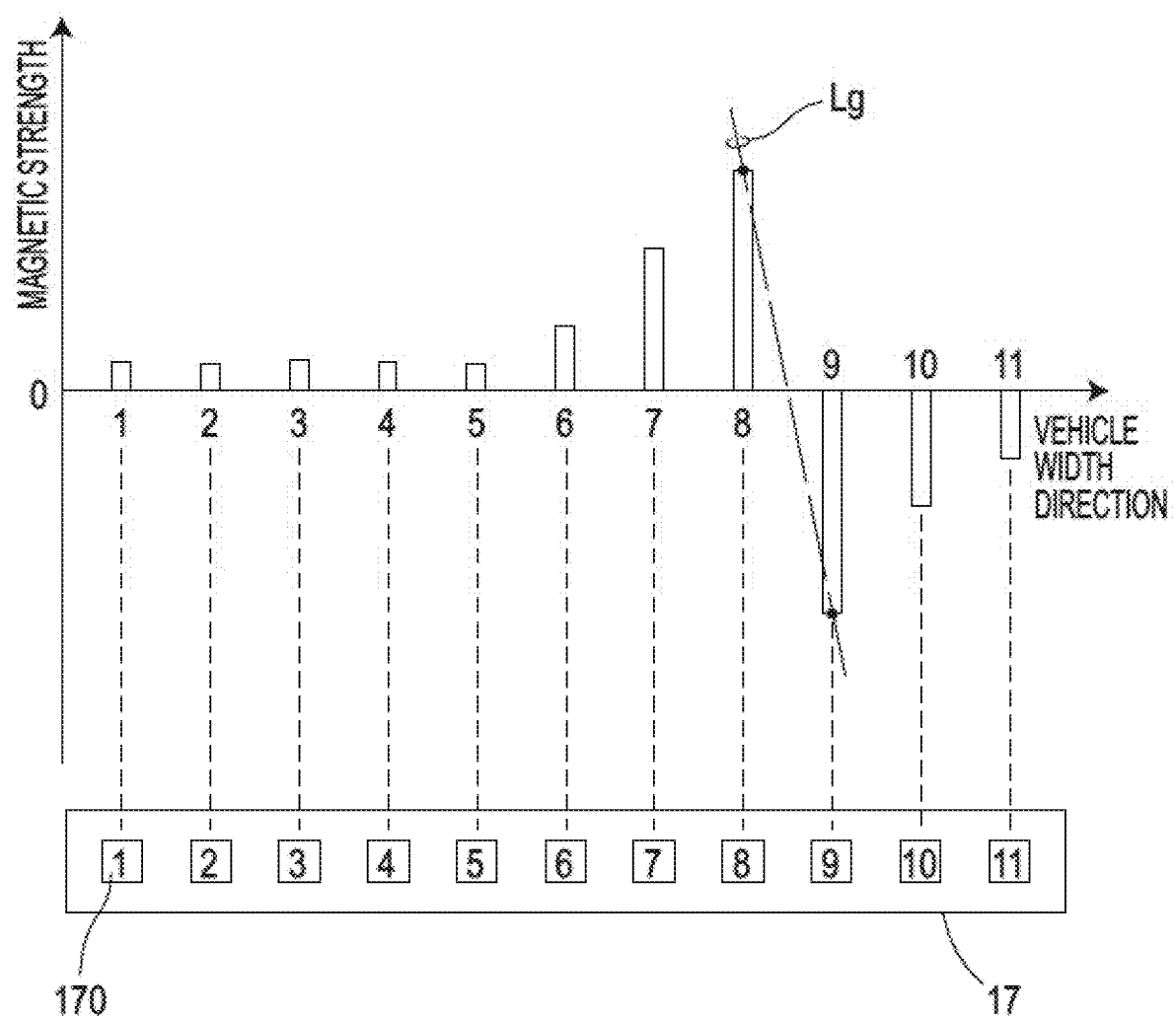

[FIG. 7]
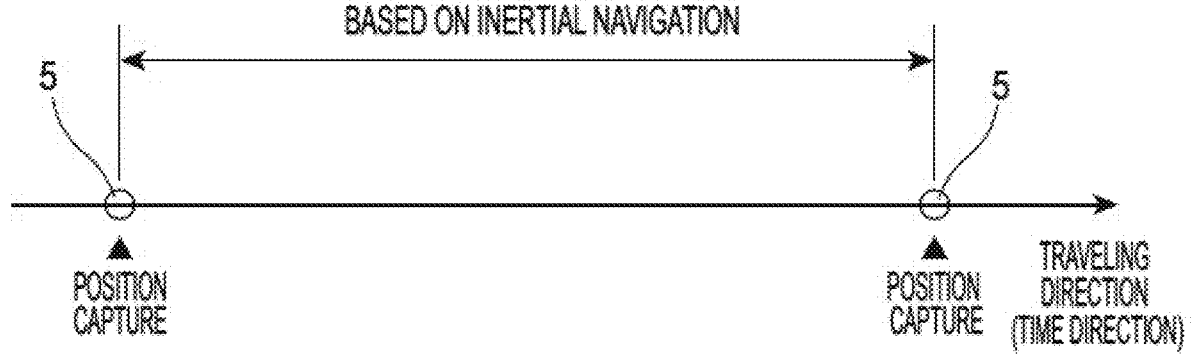

[FIG. 8]
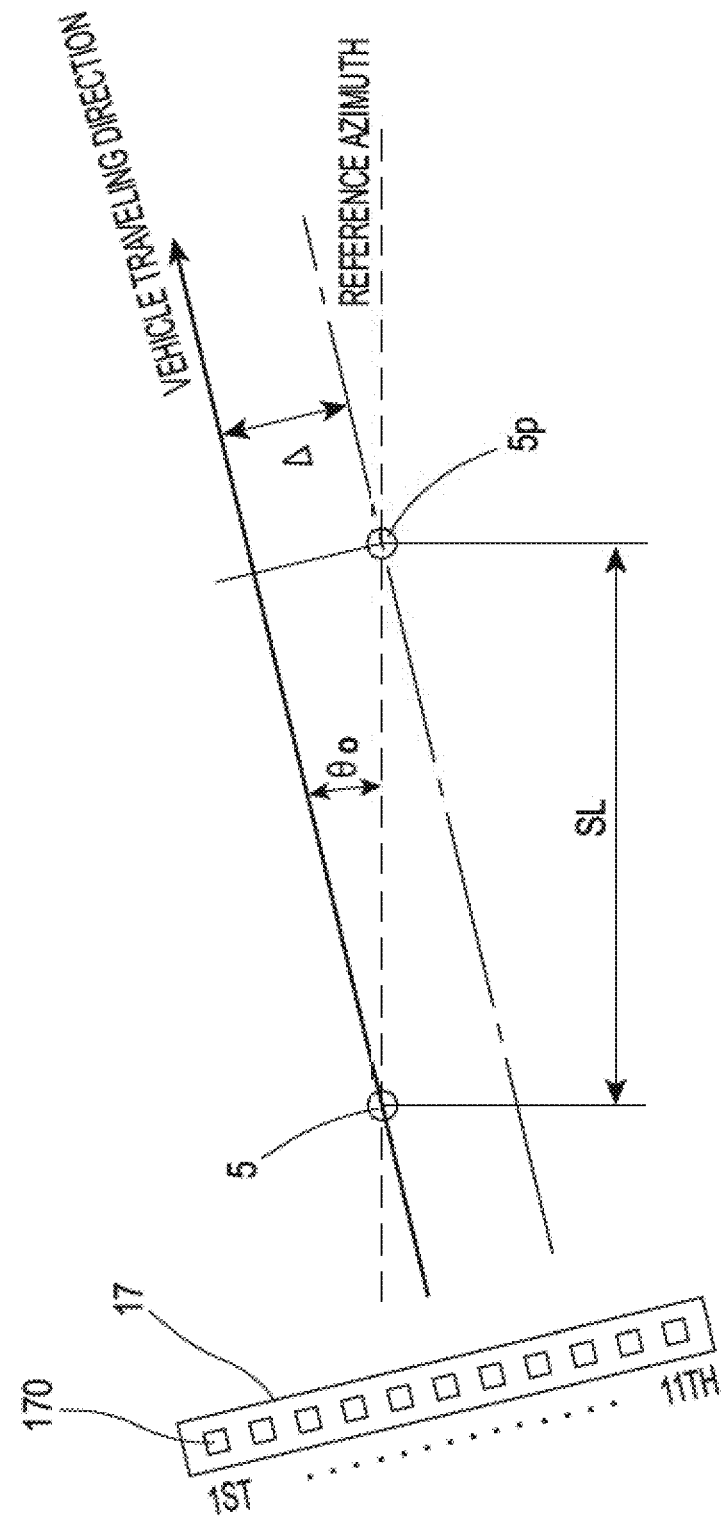

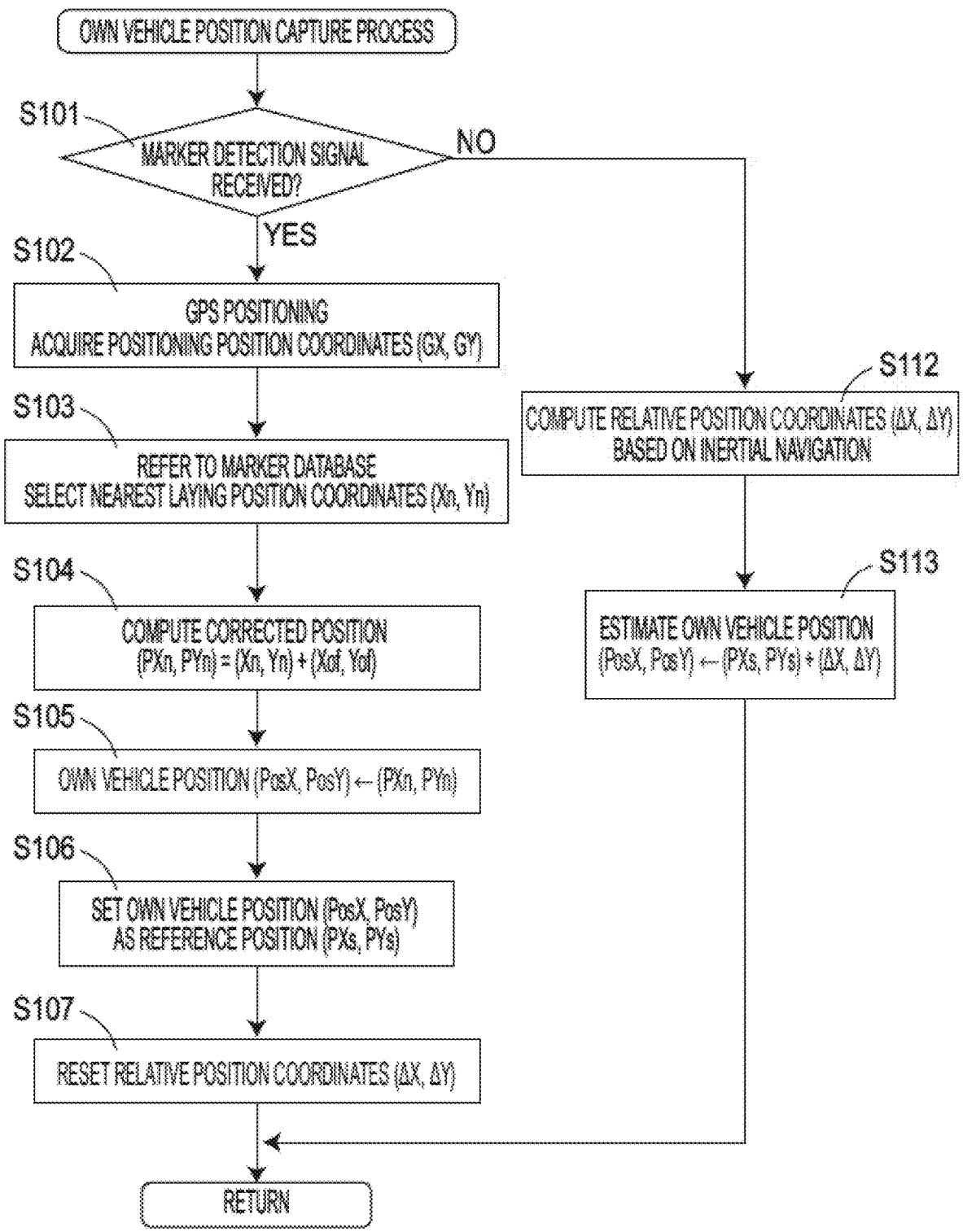
[FIG. 9]

[FIG. 10]
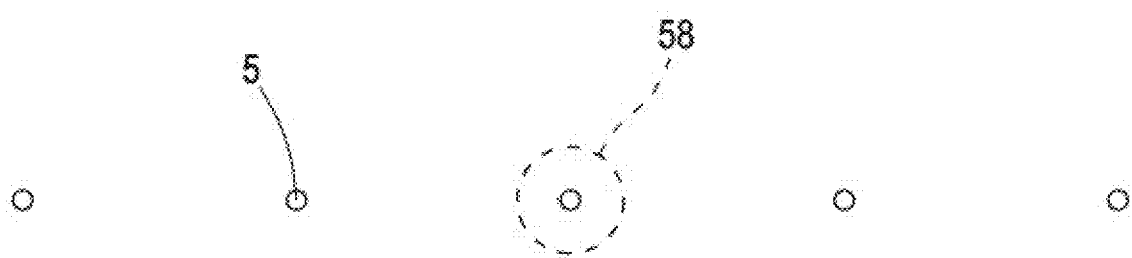

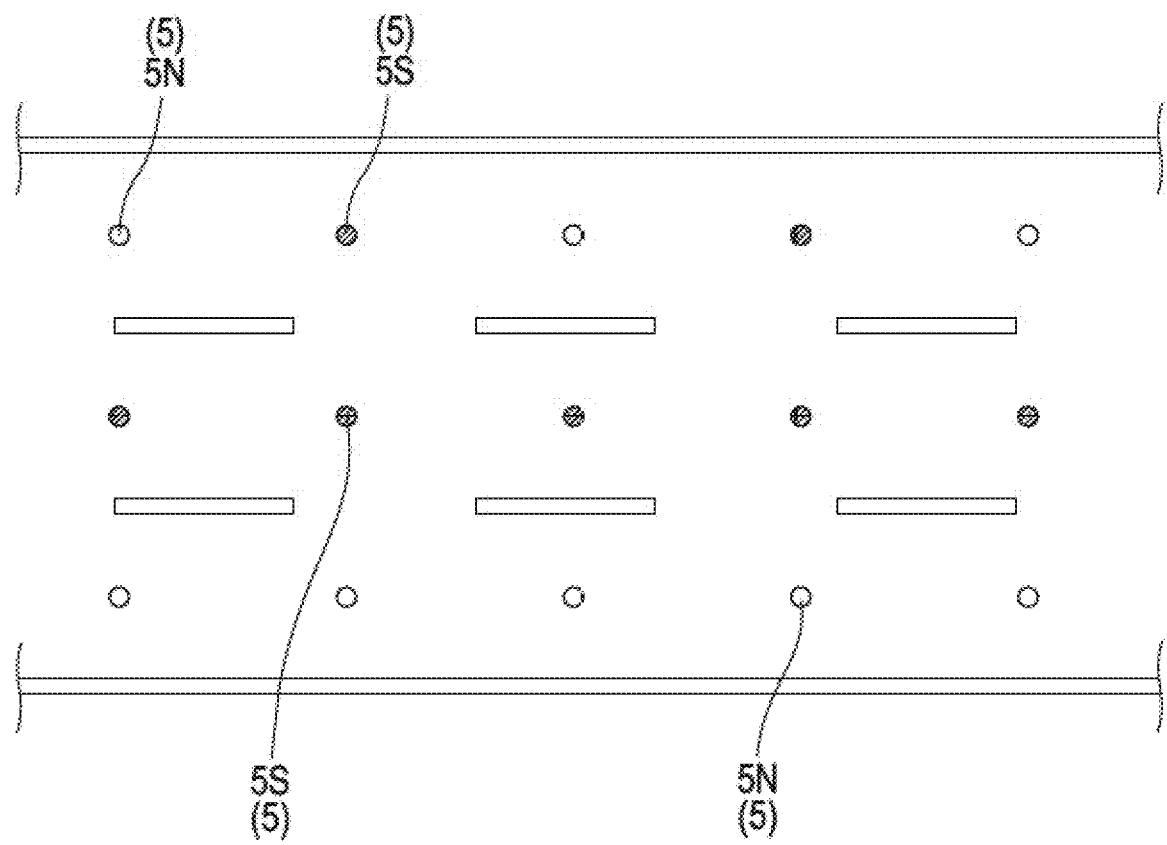
[FIG. 11]

POSITION CAPTURE METHOD AND SYSTEM

CROSS-REFERENCE TO RELATED APPLICATIONS

This application is a National Stage Application based on PCT/JP2017/020048, filed on 30 May 2017, and claims priority to Japanese Patent Application No. 2016-111996, filed on 3 Jun. 2016, the entire contents of which being incorporated herein by reference.

TECHNICAL FIELD

The present invention relates to a position capture method for capturing the own position of a vehicle and a system that captures an own vehicle position by using this position capture method.

BACKGROUND ART

Conventionally, there has been known a position capture system based on the GPS (Global Positioning System). A vehicle equipped with a GPS receiver is able to measure the absolute position of itself through radio waves from GPS satellites and, for example, can display the position of itself on a map associated with the absolute position (see, for example, Patent Literature 1).

CITATION LIST

Patent Literature

Patent Literature 1: JP H10-47983

SUMMARY OF INVENTION

Technical Problem

However, the conventional position capture system has the following problem. That is, the conventional position capture system is undesirably not sufficient in accuracy of a position it captures.

The present invention was made in view of the above-described conventional problem to provide a high-accuracy position capture method and system.

Solution to Problem

A first aspect of the present invention is directed to a position capture method for capturing an own vehicle position by using a positioning part that measures a position of a vehicle and a plurality of magnetic markers laid on a traveling path of the vehicle with their laying positions specified, including:

upon detection of any of the plurality of magnetic markers, selecting, from among the laying positions of the plurality of magnetic markers, the laying position located nearest to an actual measured position measured by the positioning part; and capturing, as the own vehicle position, the laying position or a corrected position based on the laying position.

A second aspect of the present invention is directed to a system including:

a positioning part that measures a position of a vehicle;

a detection unit that detects magnetic markers laid on a traveling path of the vehicle; and a storage device in which to store position information representing positions in which the magnetic markers are laid, the system being configured to be able to capture an own vehicle position by using the position capture method according to the first aspect.

Advantageous Effects of Invention

In the position capture method according to the present invention, upon detection of any of the magnetic markers, the laying position nearest to the actual measured position is selected from among the laying positions of the plurality of magnetic markers. Then, the laying position or the corrected position based on the laying position is captured as the own vehicle position. Since the position of the magnetic marker is fixed, it is comparatively easy to secure the accuracy of the laying position. Capturing the laying position or the like of the magnetic marker as the own vehicle position upon detection of the magnetic marker makes high-accuracy position capture possible.

Thus, the position capture method according to the present invention is characterized in, without treating the actual measured position measured by the positioning part as the own vehicle position, using the actual measured position for selecting the nearest laying position. This position capture method makes it possible to improve positional accuracy by selecting the laying position nearest to the actual measured position and capturing the own vehicle position on the basis of this laying position. Moreover, a system employing this position capture method is capable of high-accuracy operation with use of an own vehicle position captured with high accuracy.

BRIEF DESCRIPTION OF DRAWINGS

FIG. 1 is a descriptive diagram depicting a navigation system that constitutes an example of a system;

FIG. 2 is a block diagram depicting an electrical configuration of an onboard system;

FIG. 3 is a descriptive diagram depicting a sensor unit;

FIG. 4 is a descriptive diagram depicting a relationship between the sensor unit attached to a vehicle and a magnetic marker;

FIG. 5 is a descriptive diagram illustrating a marker coordinate table;

FIG. 6 is a graph depicting a distribution of magnetic strengths measured by the sensor unit;

FIG. 7 is a descriptive diagram of an own vehicle position estimation section based on inertial navigation;

FIG. 8 is a descriptive diagram of a method for computing a traveling direction of the vehicle in an azimuth identification section;

FIG. 9 is a flow chart depicting the flow of the own vehicle position capture process;

FIG. 10 is a diagram depicting a relationship between spacings at which magnetic markers are placed and GPS positioning accuracy; and FIG. 11 is a diagram illustrating a road where each lane has different polarities of magnetic markers.

DESCRIPTION OF EMBODIMENTS

The following describes preferred aspects of the present invention.

The corrected position may be captured as the own vehicle position, the corrected position being obtained by correcting the nearest laying position with a lateral shift amount, the lateral shift amount being a deviation of the vehicle in a vehicle width direction with respect to the magnetic marker thus detected.

Capturing the laying position of the magnetic marker as the own vehicle position of when the magnetic marker is detected, the lateral shift amount of the vehicle passing over the magnetic marker becomes an error. On the other hand, correcting the laying position with the lateral shift amount makes it possible to further improve the accuracy of capturing the own vehicle position.

A spacing between magnetic markers laid on the traveling path in order to capture the own vehicle position may be set to be wider than a radius of an error circle within which the actual measured position measured by the positioning part falls with a predetermined probability or higher or wider than a value obtained by multiplying, by a coefficient, a maximum error anticipated in the actual measured position.

When the spacing between magnetic markers laid on a traveling path in order to capture the own vehicle position is set to be wider than the radius of the error circle, there is less fear that two or more of the laying positions may fall within the error circle centered at the actual measured position. In this case, it becomes easy to select a laying position located nearest to the actual measured position. It should be noted the predetermined probability may be, for example, a probability that is determined on the basis of a statistical index value such as a standard deviation. For example, in a case where errors in the actual measured position form a normal distribution, the probability is approximately 95.45% if the radius of the error circle takes on a value that is double the standard deviation. Further, the probability is 99.73% if the radius of the error circle takes on a value that is triple the standard deviation.

In employing the value obtained by multiplying the maximum error by the coefficient, a value such as 1, 1.5, or 2 can be set as the coefficient. For example, when the coefficient takes on a value of 1, the maximum error per se serves as the value obtained by multiplication.

It should be noted that the positioning part may be a device or the like that measures an absolute position on the basis of the principles of triangulation by receiving satellite radio waves, i.e. radio waves from artificial satellites (GPS satellites). With the device or the like that measures an absolute position on the basis of the principles of triangulation by receiving satellite radio waves, the radius of the error circle is as comparatively large as approximately 10 to 100 m. In such a case, the working effect of the present invention of capturing the own vehicle position with high accuracy by using the laying position of the magnetic marker becomes more effective. It should be noted that the positioning part may be a positioning part based on inertial navigation instead of being as noted above.

During a period from capture of the own vehicle position upon detection of the magnetic marker to detection of another one of the magnetic markers, the own vehicle position may be estimated by inertial navigation by which to find a displacement of the vehicle on the basis of information representing a motion of the vehicle.

In this case, the own vehicle position can be estimated with high accuracy even when the vehicle is located in between adjacent ones of the magnetic markers. Further, when another one of the magnetic markers has been detected during estimation of an own vehicle position by inertial navigation, an own vehicle position captured upon detection of the magnetic marker and an own vehicle position estimated by inertial navigation may be compared with each other. Making such a comparison makes it possible to grasp errors or the like in measured values such as vehicle speed, acceleration, and yaw rate that are used in inertial navigation as information representing a motion of the vehicle. Being able to grasp errors or the like in the measured values makes it possible to acquire a guideline for correcting the measured values and improve the accuracy of subsequent inertial navigation.

An azimuth identification section may be provided in which at least two magnetic markers are installed along a line segment whose azimuth and spacing are known, and a traveling direction of the vehicle with respect to the line segment may be identified in the azimuth identification section.

In this case, passage of the vehicle through the azimuth identification section makes it possible to identify a traveling direction of the vehicle. Being able to identify the traveling direction of the vehicle makes it possible, for example, to improve the accuracy of estimation of the own vehicle position by inertial navigation.

The system according to the present invention may be a system in which the magnetic markers are laid along a predetermined route where the vehicle moves, the system further including a control part that controls the vehicle so that the vehicle moves along the route.

In this case, the own vehicle position can be captured with high accuracy when the vehicle moves along the route. An increase in accuracy of the own vehicle position leads to good controllability such as steering control for causing the vehicle to move along the route, thus making it possible to improve the accuracy with which the vehicle follows the route.

EMBODIMENTS

Embodiment 1

Embodiment 1 is an example of a position capture method and system for capturing a position with high accuracy by using magnetic markers 5. This position capture method is widely applicable to various systems such as drive assist systems such as automatic braking and lane departure avoidance control, automatic vehicle-driving systems that cause vehicles to automatically travel, and navigation systems. The following describes a navigation system 1, which is an example of a system, with reference to FIG. 1 to FIG. 11.

As shown in FIG. 1, the navigation system 1 is a system that is able to capture an own vehicle position by positioning based on the GPS (Global Positioning System) and can also capture the own vehicle position with high accuracy by using magnetic markers 5 laid along a lane in which a vehicle 4 travels.

The navigation system 1 is able to execute routing assistance or the like regardless of whether it is in a road or section laid with magnetic markers 5. In a road or section laid with no magnetic markers 5, the navigation system 1 can measure the own vehicle position by using the GPS and is able to execute a display of a map of the surrounding area, routing assistance, and the like. In a road or the like laid with magnetic markers 5, the navigation system 1 can capture the own vehicle position with higher accuracy by using the magnetic markers 5.

Roads or the like laid with magnetic markers 5 may be set as, for example, urban roads with many intersections and alleys, sections placed before diverging lanes and merging lanes on automobile-limited highways, and the like. Being able to achieve high-accuracy position capture in such a road or section makes it possible to achieve high-accuracy routing assistance and also makes it possible to provide other onboard systems with information useful to vehicle control such as automatic braking.

As shown in FIG. 2, the navigation system 1 is configured mainly by a navigation unit 11 including a control substrate 110 and a hard disk drive (HDD) 112. Connected to the navigation unit 11 are an onboard display 131 and a speaker 132, which present information such as a map, and a GPS antenna 121, an acceleration sensor 122, a yaw rate sensor 123, a marker detection unit 15, and the like.

The onboard display 131 is a touch panel display in which a touch screen sheet is laminated on a display screen of a liquid crystal panel. The onboard display 131 includes an input function of accepting various input operations such as route settings and display settings.

The GPS antenna 121 is an antenna that receives satellite radio waves that are transmitted from GPS satellites.

The acceleration sensor 122 detects longitudinal acceleration and lateral acceleration that occur at a gravity center of the vehicle 4. Separate integration of the longitudinal acceleration and the lateral acceleration, which are detected at the gravity center, makes it possible to compute longitudinal velocity and lateral velocity, and furthermore, composition of the longitudinal velocity and the lateral velocity makes it possible to compute the velocity of the vehicle. Note here that the longitudinal velocity means the velocity of the vehicle in a longitudinal direction, that the lateral velocity means the velocity of the vehicle in a lateral direction, that the longitudinal acceleration means the acceleration of the vehicle in a longitudinal direction, and that the lateral acceleration means the acceleration of the vehicle in a lateral direction.

The yaw rate sensor 123 detects a yaw rate, i.e. a rotation angular velocity that occurs around a normal axis (vertical axis) of the gravity center of the vehicle 4.

The marker detection unit 15 is a detection unit for the magnetic marker 5 including a detection substrate 150 that executes a process for detecting the magnetic marker 5. Electrically connected to the marker detection unit 15 is a sensor unit 17 having a plurality of magnetic sensors 170 (see FIG. 3) arrayed.

The following describes the configurations and the like of the sensor unit 17, the marker detection unit 15, and the navigation unit 11.

As shown in FIG. 3, the sensor unit 17, which configures the magnetic marker 5 detection unit together with the marker detection unit 15, is a unit of eleven magnetic sensors 170 arrayed in a line. As shown in FIG. 4, the sensor unit 17 is installed on a bottom surface 40 side of the vehicle 4 so as to be able to easily detect the magnetic marker 5 laid on a road surface 50. The sensor unit 17, whose first to eleventh magnetic sensors 170 are arrayed at spacings of 15 cm, is attached along a vehicle width direction of the vehicle 4 so that the central sixth magnetic sensor 170 is located in the center of the vehicle width direction.

Embodiment 1 employs, as each of the magnetic sensors 170, an MI sensor including an MI (Magneto Impedance) element (not illustrated) obtained by winding a pickup coil around an amorphous wire serving as a magneto-sensitive body. The MI element is an element that senses magnetism that acts in a longitudinal direction of the amorphous wire. The magnetic sensor 170, employing this MI element, converts the voltage, generated in the pickup coil when a pulse current is passed through the amorphous wire, into a sensor signal and outputs. The MI element has such characteristics that the magnitude of the voltage of the pickup coil varies according to the magnitude of magnetism that acts on the amorphous wire and the voltage of the pickup coil switches between being positive and being negative according to the orientation of the magnetism that acts on the amorphous wire.

In the magnetic sensor 170 according to Embodiment 1, the amorphous wire is disposed along the vehicle width direction. Accordingly, during passage of the vehicle 4 over the magnetic marker 5, the direction of the magnetism that acts on the amorphous wire is reversed according to whether the magnetic sensor 170 is located on the right or left side of the magnetic marker 5 and the sensor signal switches between being positive and being negative.

Note that usable examples of the magnetic sensor 170 include various types of sensor such as a sensor based on a hole element or a magnetoresistance-effect element and a flux-gate sensor as well as the MI sensor including the MI element described above. A height in the vehicle 4 at which the magnetic sensor 170 is attached is approximately 100 to 200 mm. The magnetic sensor 170 may be a magnetic sensor that is able to detect the magnetic field of the magnetic marker 5 at a distance of approximately 100 to 200 mm.

The detection substrate 150 (FIG. 2) accommodated in the marker detection unit 15 is a substrate mounted with a microcomputer including a CPU, a ROM, and a RAM in the form of a single chip (not illustrated). The detection substrate 150 fulfils various functions through the CPU processing an operation program stored in advance in the ROM. The detection substrate 150 is provided with the following circuits. Note that for the marker detection unit 15, an integrated configuration with the navigation unit 11 may be employed.

(1) Marker detection circuit 15A: Circuit that detects the magnetic marker 5 through signal processing or the like of sensor signals that are outputted from each separate magnetic sensor 170 of the sensor unit 17.

(2) Lateral shift amount computation circuit 15B: Circuit that computes a lateral shift amount, i.e. a deviation of the vehicle 4 in the vehicle width direction with respect to the magnetic marker 5 during passage over the magnetic marker 5. The lateral shift amount is the amount of a relative deviation of the magnetic marker 5 in the vehicle width direction with respect to the position of the sixth magnetic sensor 170, which lies in the center of the sensor unit 17.

The control substrate 110 (FIG. 2) accommodated in the navigation unit 11 is a substrate provided with an electronic circuit mounted with a CPU, a ROM, a RAM, and the like (not illustrated). The control substrate 110 fulfils various functions through the CPU processing an operation program stored in the RON. The control substrate 110 is provided with the following circuits (1) to (4). Further, the hard disk drive 112, which functions as a database, fulfils functions as the following storage devices (5) and (6).

(1) GPS positioning circuit 11A (positioning part): Circuit that measures the own vehicle position on the basis of the principles of triangulation through satellite radio waves (radio waves from GPS satellites) received by the GPS antenna 121. In the following description, the own vehicle position measured through satellite radio waves is referred to as "actual measured position". It should be noted that the positioning accuracy by the GPS positioning circuit 11A according to Embodiment 1 is ±10 m. This ±10 m accuracy means that the actual measured position has a 95.4% (2σ, where σ is the standard deviation) probability of falling within an error circle with a radius of 10 m centered at the original position.

(2) Inertial navigation circuit 11B (positioning part): Circuit that computes relative position coordinates ($\Delta X$, $\Delta Y$) representing a displacement of the vehicle 4 by using measured values of acceleration (or velocity) and yaw rate as information representing a motion of the vehicle 4.

(3) Position capture circuit 11C: Circuit that captures the own vehicle position by using the magnetic marker 5. When the magnetic marker 5 has been detected, the position capture circuit 11C captures the own vehicle position on the basis of the laid position of the magnetic marker 5.

(4) Information display circuit 11D: Circuit that causes the onboard display 131 to display map information and traffic information.

(5) Map information storage device: Device that has stored therein map information (map data) linked with position information representing the absolute position and forms a map database (map DB) 113.

(6) Laying position storage device: Storage device that has stored therein the laying position of each magnetic marker 5 and forms a marker database (marker DB) 114 that has stored therein a marker coordinate table illustrated in FIG. 5.

The following describes (1) Mode of Laying Magnetic Markers, (2) Marker Detection Process, and (3) Measurement of Positions by Inertial Navigation, which are important for the navigation system 1 according to Embodiment 1.

(1) Mode of Laying Magnetic Markers

Magnetic markers 5, for example, are laid along the center of a lane that constitutes an example of a traveling path along which the vehicle 4 travels. Spacings at which the magnetic markers 5 are laid are set to be 50 m, which is wider than the ±10 m positioning accuracy based on satellite radio waves. Moreover, laying position coordinates (Xn, Yn) representing the laying position of each magnetic marker 5 are recorded in the marker coordinate table illustrated in FIG. 5 stored in the marker database 114.

Furthermore, in Embodiment 1, some of the magnetic markers 5 laid at every constant distance configure an azimuth identification section (which will be described later with reference to FIG. 8) for identifying the traveling direction of the vehicle 4. The magnetic marker 5 configuring the azimuth identification section is managed in the marker coordinate table illustrated in FIG. 5 so as to be distinguishable from other magnetic markers 5. Further, for the magnetic marker 5 configuring the azimuth identification section, section information (span SL, reference azimuth) that is necessary to compute the traveling direction of the vehicle 4 is stored.

(2) Marker Detection Process

The marker detection unit 15 executes detection of the magnetic marker 5 and computation of the lateral shift amount by using the sensor signals from the eleven magnetic sensors 170 of the sensor unit 17. For example, during passage of the vehicle 4 over the magnetic marker 5, a distribution illustrated in FIG. 6 is obtained as a distribution of magnetic strengths represented by the sensor signals from each separate magnetic sensor 170.

The marker detection unit 15 determines, on the basis of temporal changes in strength of magnetism that acts on the magnetic sensors 170, that the magnetic marker 5 has been detected when the temporal peak value has exceeded a positive or negative threshold set in advance. When having determined that it has detected the magnetic marker 5, the marker detection unit 15 computes the lateral shift amount in the vehicle width direction with respect to the magnetic marker 5 from the magnetic strength distribution illustrated in FIG. 6. For example, since, in the example shown in FIG. 6, a zero-cross has occurred in a gap between the eighth and ninth magnetic sensors 170, it can be determined that the magnetic marker 5 has relatively passed through the gap. For example, it is also possible to identify the position of a zero-cross at which a straight line Lg connecting the magnetic strengths of the eighth and ninth magnetic sensors 170 intersects with a straight line of (magnetic strength=zero) and estimate the position of this zero-cross as the position of passage of the magnetic marker 5. For example, if the magnetic strengths of the eighth and ninth magnetic sensors 170 are equal in absolute value to each other, the straight line Lg intersects with the straight line of (magnetic strength=zero) at the 8.5th position, which falls right in between the eighth and ninth magnetic sensors 170. In this case, it can be estimated that the magnetic marker 5 has passed through the 8.5th position. Since, as noted above, the spacings between the magnetic sensors 170 of the sensor unit 17 are 15 cm and the sixth magnetic sensor 170 is located in the center of the vehicle 4, the lateral shift amount of the vehicle 4 with respect to the magnetic marker 5 during passage over the magnetic marker 5 can be computed as (8.5th–6th)×15 cm=37.5 cm. The marker detection unit 15 outputs the lateral shift amount together with a marker detection signal.

Note that as for the method for detecting the magnetic marker 5, in addition to a threshold determination of a temporal peak value of the strengths of magnetism that acts on each separate magnetic sensor 170, conditions for determining detection may include the occurrence of such a zero-cross as that illustrated in FIG. 6 in the magnetic strength distribution of the magnetic sensors 170, the occurrence of positive and negative peak values on both sides, respectively, of the zero-cross that are equal in absolute value to each other, and the like. Further, the method for identifying a zero-cross may be a method for identifying a zero-cross by first order (linear) approximation of a waveform of magnetic strength, and also may be a method for identifying a zero-cross by second or third order approximation of a waveform of magnetic strength, or the like.

(3) Measurement of Positions by Inertial Navigation

Relative position coordinates ($\Delta X$, $\Delta Y$) that are computed by inertial navigation are utilized to estimate the own vehicle position, regardless of whether it is in a road or section laid with magnetic markers 5. In particular, in a road or the like laid with magnetic markers 5, as shown in FIG. 7, a section from capture of the own vehicle position by detection of a magnetic marker 5 by the vehicle 4 to reaching of the next magnetic marker 5 is set as an own vehicle position estimation section in which to estimate the own vehicle position by inertial navigation. In this own vehicle position estimation section, a position estimated by inertial navigation is captured as the own vehicle position.

According to inertial navigation, a computing equation including the longitudinal acceleration and the lateral acceleration measured by the acceleration sensor 122 and the yaw rate measured by the yaw rate sensor 123 is used to compute relative position coordinates ($\Delta X$, $\Delta Y$) representing a displacement from a position serving as a reference (reference position) such as a position at which a magnetic marker 5 was detected and captured.

A path from the reference position to the relative position coordinates ($\Delta X$, $\Delta Y$) can be computed by Mathematical Expression 1 below using the longitudinal velocity Vx, the lateral velocity Vy, and the yaw rate r. For example, in the case of the own vehicle position estimation section (FIG. 7) falling in a gap between adjacent magnetic markers 5, the own vehicle position captured during passage over the magnetic marker 5 serves as the reference position.

$$\Delta X = \int V \cos(\beta+\phi)dt$$

$$\Delta Y = \int Y \sin(\beta+\phi)dt \qquad \text{[Math. 1]}$$

where V, β, and φ are defined as follows:

$$V = (Vx^2 + Vy^2)^{1/2}$$

$$\beta = Vy/Vx$$

$$\phi = \int rdt$$

Embodiment 1 makes it possible to identify the traveling direction of the vehicle 4 by providing, for some magnetic markers 5, the aforementioned azimuth identification section laid with a magnetic marker 5 and a magnetic marker 5p placed at a comparatively narrow spacing as shown in FIG. 8.

As noted above, in the marker coordinate table of FIG. 5, the magnetic marker 5 configuring the azimuth identification section is distinguished by means of flag data corresponding to an open circle (o). For this magnetic marker 5, section information on the azimuth identification section is recorded in addition to the laying position coordinates (Xn, Xy). The section information is information on a reference distance (span SL), i.e. a spacing between the magnetic marker 5 and the magnetic marker Sp, and a reference azimuth representing the direction of a line segment on which the magnetic marker 5 and the magnetic marker 5p are located. It should be noted that FIG. 5 represents the reference azimuth clockwise based on true north. For example, as for the azimuth identification section of the marker m, the reference distance is 2000 mm and the reference azimuth is an azimuth of 235° clockwise based on true north.

During passage of the vehicle 4 through the azimuth identification section, as shown in FIG. 8, measuring a variation A in lateral shift amount during passage over the first and second magnetic markers 5 and 5p makes it possible to compute the traveling direction $\theta_0$ of the vehicle 4 with respect to the reference azimuth according to the following equation. $\theta_0$ is an angle formed by the traveling direction of the vehicle 4 and the reference azimuth of the azimuth identification section. For example, in the case of the azimuth identification section of the marker m, an angle obtained by adding $\theta_0$ to the reference azimuth of 235° is the absolute azimuth of the traveling direction of the vehicle 4 based on true north.

$$\sin \theta_o = A/SL \qquad \text{[Math. 3]}$$

The following describes operation of the navigation system 1 with reference to a flow chart of FIG. 9. The navigation unit 11 reads out surrounding map information with reference to the map database 113 by using the own vehicle position thus captured and displays the surrounding map information on the onboard display 131. When a magnetic marker 5 is detected upon entry into a road or the like laid with magnetic markers 5, the navigation system 1 according to Embodiment 1 is brought into an operation mode in which to perform position capture by using magnetic markers 5. After that, when the distance moved since detection of the magnetic marker 5 has exceeded a predetermined distance after movement away from the road or the like laid with magnetic markers 5, a switch is made to an operation mode in which no magnetic markers 5 are used. In a road or section laid with no magnetic markers 5, the navigation system 1 operates in a manner which is similar to a manner of operation of a well-known navigation system including a positioning unit using satellite radio waves.

When the vehicle 4 is traveling on a road or section laid with magnetic markers 5, the navigation unit 11 performs different operations depending on whether it has received a marker detection signal from the marker detection unit 15 (S101).

Upon receiving a marker detection signal (S101: YES), the navigation unit 11 acquires, by computation, positioning position coordinates (GX, GY) serving as an actual measured position measured by positioning based on satellite radio waves (S102). Then, the positioning position coordinates (GX, GY) are used to select the nearest laying position coordinates (Xn, Yn) with reference to the marker coordinate table (FIG. 5) (S103).

Note here that in Embodiment 1, as shown in FIG. 10, the spacings at which the magnetic markers 5 are laid are 50 m, while the positioning accuracy based on satellite radio waves is 10 m. Therefore, there is less fear that the laying positions of two or more magnetic markers 5 may fall within an error circle 58 with a radius of 10 m of accuracy centered at an actual measured position based on satellite radio waves upon detection of any of the magnetic markers 5, and any of the nearest laying position coordinates (Xn, Xy) (see FIG. 5) can be selected with high reliability.

The navigation unit 11 finds a corrected position (PXn, PYn) obtained by correcting the laying position coordinates (Xn, Yn) with the lateral shift amount (Xof, Yof) received together with the marker detection signal (S104), and captures this corrected position (PXn, PYn) as the own vehicle position (PosX, PosY) (S105).

Having thus successfully captured the own vehicle position (PosX, PosY) by using a magnetic marker 5, the navigation unit 11 sets this own vehicle position (PosX, PosY) as a reference position (PXs, PYs) of inertial direction in a new own vehicle position estimation section (see FIG. 7) until detection of the next magnetic marker 5 (S106). Further, in preparation for a new own vehicle position estimation section, the navigation unit 11 resets the relative position coordinates (ΔX, ΔY), computed by inertial navigation, to zero for initialization (S107).

When the vehicle 4 passes over a magnetic marker 5 and enters a new own vehicle position estimation section, no marker detection signal is to be received (S101: NO). Accordingly, the navigation unit 11 computes, by inertial navigation, relative position coordinates (ΔX, ΔY) representing a displacement from the reference position (S112). Then, the navigation unit 11 estimates the own vehicle position (PosX, PosY) by adding the relative position coordinates (ΔX, ΔY) to the reference position (PXs, PYs) (S113). In the own vehicle position estimation section (FIG. 7) until the vehicle 4 reaches the next magnetic marker 5, the navigation unit 11 repeatedly executes a process of estimating the own vehicle position by inertial navigation.

As noted above, the navigation system 1 according to Embodiment 1 is characterized in a method for capturing the own vehicle position in a road or section laid with magnetic markers 5. In a road laid with magnetic markers 5, the actual measured position measured by the GPS positioning circuit 11A is hardly treated directly as the own vehicle position. When the magnetic marker 5 has been detected, the laying position located nearest to the actual measured position measured by the GPS positioning circuit 11A is selected from among the laying positions of a plurality of magnetic markers 5, and the own vehicle position is captured on the basis of this laying position.

Further, in the own vehicle position estimation section falling in a gap between adjacent magnetic markers 5, the own vehicle position is estimated by inertial navigation in a state where the own vehicle position captured upon detection of the magnetic marker 5 is set as a reference position. A spacing between the magnetic markers 5 is as comparatively short as 50 m, so that there is little accumulation of estimation errors caused by inertial navigation. Therefore, the estimation accuracy by inertial navigation in the own vehicle position estimation section is with high accuracy that exceeds the ±10 m positioning accuracy by the GPS positioning circuit 11A.

In the GPS positioning circuit 11A, error in the actual measured position becomes larger as radio wave conditions become worse due to an external environment such as a forest of buildings. The position capture method involving the use of magnetic markers 5 according to Embodiment 1 is less susceptible to errors caused by the GPS positioning circuit 11A, as the actual measured position measured by the GPS positioning circuit 11A does not directly serve as the own vehicle position. Accordingly, the position capture method according to Embodiment 1 makes it possible to capture the own vehicle position with high accuracy regardless of magnitude of a positioning error caused by the GPS positioning circuit 11A.

Thus, the navigation system 1, which configures an example of a system according to the present invention, is an excellent system that can capture the own vehicle position with high accuracy by using magnetic markers 5. In a road or section laid with magnetic markers 5, the own vehicle position can be captured with much higher accuracy than by a common navigation system that captures the own vehicle position by GPS positioning. Being able to capture the own vehicle position with high accuracy makes it possible to execute routing assistance such as a left turn, a right turn, diverging, or merging with high accuracy. Furthermore, the high-accuracy own vehicle position that the navigation system 1 captures can be widely utilized in vehicle control systems such as automatic braking before a stop line of an intersection, lane-following steering, and automatic driving.

Instead of or in addition to the configuration of Embodiment 1, the following configurations may be employed. Alternatively, a proper combination of the following configurations may be employed.

Embodiment 1 illustrates the navigation system 1 as an example of a system that executes the position capture method using magnetic markers 5. The system may be a system such as a lane departure warning system, an automatic steering system that enables lane-following traveling, an automatic vehicle-driving system, or an automatic bus operation system. In the case of these systems, high-accuracy automatic steering, automatic driving, and the like can be achieved by capturing the own vehicle position with high accuracy in a road or section laid with magnetic markers 5.

In an automatic steering system, an automatic vehicle-driving system, an automatic bus operation system, and the like, it is necessary to incorporate, into a vehicle-side system, a control part that controls a vehicle so that the vehicle moves along a route laid with magnetic markers. Examples of the control part include a unit that controls a steering actuator that changes the steering angle of a steering wheel, a unit that controls a prime mover such as an engine or a motor in order to control the vehicle speed so that the vehicle can safely negotiate a curve on a route.

There may also be such a configuration that the polarities of magnetic markers 5 may be used to provide road information or the like to the vehicle 4 side. As noted above, in each of the magnetic sensors 170 of the sensor unit 17, an amorphous wire serving as a magneto-sensitive body is disposed along the vehicle width direction. Therefore, each of the magnetic sensors 170 outputs a positive or negative sensor signal depending on whether it is located on the right or left side of a magnetic marker 5. For example, in a case where a magnetic marker 5 relatively passes through the space between the eighth magnetic sensor 170 and the ninth magnetic sensor 170, the eighth magnetic sensor 170 and the ninth magnetic sensor 170 detect magnetic strengths that are opposite in polarity to each other as shown in FIG. 6. For example, it is possible to determine the polarity of a magnetic marker 5 according to whether a magnetic strength represented by a sensor signal from a magnetic sensor 170 located on the left side of the magnetic marker 5 takes on a positive or negative value.

For example, the polarity of a magnetic marker 5 may be changed according to the type of a lane. For example, N-pole magnetic markers 5N may be arranged in a first lane of a road with two lanes on each side and S-pole magnetic markers 5S may be arranged in a second lane; furthermore, as shown in FIG. 11, magnetic markers 5N and 5S may be arranged in a third lane of a road with three lanes on each side so that the N and S poles alternate. Such an arrangement of magnetic markers 5 makes it possible to acquire type information of a lane by determining the polarities of magnetic markers 5 detected. It is difficult to identify a lane with a width of approximately 4 m by using the GPS positioning circuit 11A whose positioning accuracy is ±10 m. Therefore, the method for identifying the type of a lane through magnetic markers 5 is effective.

In the case of the navigation system 1 according to Embodiment 1, each vehicle 4 includes a marker database 114. This configuration may be replaced by connecting to an access point of an internet line by means of radio communication or providing, with a marker database, a server apparatus (not illustrated) that is accessible from a vehicle side by means of road/automobile communication or the like. The configuration may be such that laying position coordinates (Xn, Yn) are received in response to transmission to the server apparatus of positioning position coordinates (GX, GY) upon detection of a magnetic marker 5.

Although a configuration has been illustrated in which magnetic markers 5 are laid along a lane, magnetic markers 5 may be laid along a particular route without being laid along a lane. Laying magnetic markers 5 along a route that a vehicle should travel enables vehicle control such as automatic driving or automatic steering that, for example, causes the vehicle 4 to move along the route. For example, in the case of an automatic operation system or the like that causes buses or the like to automatically travel, there emerges a need for a traveling pattern that does not extend along a road direction or a lane direction, such as an action of entering a station or a terminal. Laying magnetic markers 5 along a route of entry into a station or a terminal makes it possible to achieve automatic entry into the station, the terminal, or the like with high accuracy.

Further, a plurality of magnetic markers 5 may be dispersedly placed without being laid along a route that a vehicle travels. When the vehicle has passed over any of the magnetic markers 5, the laying position of the magnetic marker 5 can be used to capture the own vehicle position. The magnetic markers 5 need only be placed such that a spacing between adjacent magnetic markers 5 is wider than the positioning accuracy by the GPS positioning circuit 11A. In Embodiment 1, a spacing that is wider than an error circle of the actual measured position is set as the spacing between magnetic markers 5. Instead of this, by using as a reference a value obtained by multiplying, by a coefficient, a maximum error anticipated in the actual measured position, a spacing that is wider than this value may be set as the spacing between magnetic markers.

While the specific examples of the present invention have been described above in detail as in the above embodiments, these specific examples merely describe examples of technologies included in the claims. Needless to say, the claims should not be restrictively construed by the configurations, numerical values, and so forth of the specific examples. The claims include technologies obtained by variously modifying, changing, and combining the specific examples as appropriate by using known technologies, knowledge, and so forth by people skilled in the art.

DESCRIPTION OF SYMBOLS 1 navigation system (system)
11 navigation unit
11A GPS positioning circuit (positioning part)
11B inertial navigation circuit (positioning part)
11C position capture circuit
11D information display circuit
112 hard disk drive
113 map database
114 marker database
15 marker detection unit (detection unit)
15A marker detection circuit
15B lateral shift amount computation circuit
17 sensor unit (detection unit)
4 vehicle
5 magnetic marker

The invention claimed is:

1. A position capture method, comprising:
storing, in a memory, a plurality of laying positions where a plurality of magnetic markers are laid;
detecting, using a magnetic sensor, at least one of the plurality of magnetic markers laid on a traveling path of a vehicle;
upon detecting the at least one of the plurality of the magnetic markers using the magnetic sensor, starting acquiring a GPS (Global Positioning System) position of a vehicle based on satellite radio waves received by a GPS antenna;
comparing the acquired GPS position of the vehicle, which has been acquired upon detecting the at least one of the plurality of the magnetic markers, with the plurality of laying positions stored in the memory;
identifying, from among the plurality of laying positions of the plurality of magnetic markers, a laying position of the detected at least one of the plurality of the magnetic markers located nearest to the GPS position of the vehicle based on the comparison; and
outputting the identified laying position as a current position of the vehicle, wherein
the acquiring of the GPS position is performed only upon detecting the at least one of the plurality of the magnetic markers, and
the acquiring of the GPS position is not performed before detecting the at least one of the plurality of the magnetic markers.

2. The position capture method according to claim 1, wherein the corrected position is captured as the own vehicle position, the corrected position being obtained by correcting the nearest laying position with a lateral shift amount, the lateral shift amount being a deviation of the vehicle in a vehicle width direction with respect to the magnetic marker thus detected.

3. The position capture method according to claim 1, wherein a spacing between magnetic markers laid on the traveling path in order to capture the own vehicle position is set to be wider than a radius of an error circle within which the actual measured position measured by the positioning part falls with a predetermined probability or higher.

4. The position capture method according to claim 2, wherein a spacing between magnetic markers laid on the traveling path in order to capture the own vehicle position is set to be wider than a radius of an error circle within which the actual measured position measured by the positioning part falls with a predetermined probability or higher.

5. The position capture method according to claim 1, wherein during a period from capture of the own vehicle position upon detection of the magnetic marker to detection of another one of the magnetic markers, the own vehicle position is estimated by inertial navigation by which to find a displacement of the vehicle on the basis of information representing a motion of the vehicle.

6. The position capture method according to claim 5, wherein an azimuth identification section is provided in which at least two magnetic markers are installed along a line segment whose azimuth and spacing are known, and a traveling direction of the vehicle with respect to the line segment is identified in the azimuth identification section.

7. The position capture method according to claim 2, wherein during a period from capture of the own vehicle position upon detection of the magnetic marker to detection of another one of the magnetic markers, the own vehicle position is estimated by inertial navigation by which to find a displacement of the vehicle on the basis of information representing a motion of the vehicle.

8. The position capture method according to claim 3, wherein during a period from capture of the own vehicle position upon detection of the magnetic marker to detection of another one of the magnetic markers, the own vehicle position is estimated by inertial navigation by which to find a displacement of the vehicle on the basis of information representing a motion of the vehicle.

9. The position capture method according to claim 7, wherein an azimuth identification section is provided in which at least two magnetic markers are installed along a line segment whose azimuth and spacing are known, and a traveling direction of the vehicle with respect to the line segment is identified in the azimuth identification section.

10. The position capture method according to claim 8, wherein an azimuth identification section is provided in which at least two magnetic markers are installed along a line segment whose azimuth and spacing are known, and a traveling direction of the vehicle with respect to the line segment is identified in the azimuth identification section.

11. The position capture method according to claim 1, further comprising determining whether the at least one of the plurality of the magnetic markers has been detected using the magnetic sensor, wherein
the starting of acquiring the GPS position starts in response to determining that the at least one of the plurality of the magnetic markers has been detected using the magnetic sensor.

12. A system comprising:
a memory that stores a plurality of laying positions where a plurality of magnetic markers are laid;
a magnetic sensor that detects at least one of the plurality of magnetic markers laid on a traveling path of a vehicle; and
processing circuitry configured to upon detecting the at least one of the plurality of the magnetic markers using the magnetic sensor, start acquiring a GPS (Global Positioning System) position of a vehicle based on satellite radio waves received by a GPS antenna;

compare the acquired GPS position of the vehicle, which has been acquired upon detecting the at least one of the plurality of the magnetic markers, with the plurality of laying positions stored in the memory;

identify, from among the plurality of laying positions of the plurality of magnetic markers, a laying position of the detected at least one of the plurality of the magnetic markers located nearest to the GPS position of the vehicle based on the comparison; and output the identified laying position as a current position of the vehicle, wherein the acquiring of the GPS position by the processing circuitry is performed only upon detecting the at least one of the plurality of the magnetic markers, and the acquiring of the GPS position by the processing circuitry is not performed before detecting the at least one of the plurality of the magnetic markers.

13. The system according to claim 12, wherein
the magnetic markers are laid along a predetermined route where the vehicle moves, and
the processing circuitry controls the vehicle so that the vehicle moves along the route.

14. A position capture method, comprising:
storing, in a memory, a plurality of laying positions where a plurality of magnetic markers are laid;
detecting, using a magnetic sensor, at least one of the plurality of magnetic markers laid on a traveling path of a vehicle;
upon detecting the at least one of the plurality of the magnetic markers using the magnetic sensor, starting acquiring a GPS (Global Positioning System) position of a vehicle based on satellite radio waves received by a GPS antenna;
comparing the acquired GPS position of the vehicle, which has been acquired upon detecting the at least one of the plurality of the magnetic markers, with the plurality of laying positions stored in the memory;
identifying, from among the plurality of laying positions of the plurality of magnetic markers, a laying position of the detected at least one of the plurality of the magnetic markers located nearest to the GPS position of the vehicle based on the comparison; and
outputting the identified laying position as a current position of the vehicle, wherein
an azimuth identification section is provided in which at least two magnetic markers are installed along a line segment whose azimuth and spacing are known, and a traveling direction of the vehicle with respect to the line segment is identified in the azimuth identification section,
the storing stores, in the memory, the plurality of the laying positions to form a marker database that stores therein a marker coordinate table,
in the marker coordinate table, the at least one of the plurality of the magnetic markers configuring the azimuth identification section is distinguished by flag data,
for the magnetic marker configuring the azimuth identification section, section information on the azimuth identification section is recorded in the memory in addition to laying position coordinates of a laying position thereof, and
the section information is information on a spacing between two adjacent magnetic markers, and the azimuth representing a direction of the line segment on which the two adjacent magnetic markers are located.

15. A system comprising:
a memory that stores a plurality of laying positions where a plurality of magnetic markers are laid;
a magnetic sensor that detects at least one of the plurality of magnetic markers laid on a traveling path of a vehicle; and
processing circuitry configured to
upon detecting the at least one of the plurality of the magnetic markers using the magnetic sensor, start acquiring a GPS (Global Positioning System) position of a vehicle based on satellite radio waves received by a GPS antenna;
compare the acquired GPS position of the vehicle, which has been acquired upon detecting the at least one of the plurality of the magnetic markers, with the plurality of laying positions stored in the memory;
identify, from among the plurality of laying positions of the plurality of magnetic markers, a laying position of the detected at least one of the plurality of the magnetic markers located nearest to the GPS position of the vehicle based on the comparison; and
output the identified laying position as a current position of the vehicle, wherein
an azimuth identification section is provided in which at least two magnetic markers are installed along a line segment whose azimuth and spacing are known, and a traveling direction of the vehicle with respect to the line segment is identified in the azimuth identification section,
the memory stores the plurality of the laying positions to form a marker database that stores therein a marker coordinate table,
in the marker coordinate table, the at least one of the plurality of the magnetic markers configuring the azimuth identification section is distinguished by flag data,
for the magnetic marker configuring the azimuth identification section, section information on the azimuth identification section is recorded in the memory in addition to laying position coordinates of a laying position thereof, and
the section information is information on a spacing between two adjacent magnetic markers, and the azimuth representing a direction of the line segment on which the two adjacent magnetic markers are located.

\* \* \* \* \*